United States Patent
Wagner et al.

(10) Patent No.: US 12,337,726 B2
(45) Date of Patent: Jun. 24, 2025

(54) METHOD AND DEVICE FOR PROVIDING A STORAGE CAPACITY RESERVE IN A TRACTION BATTERY FOR IMMINENT DOWNHILL DRIVE

(71) Applicant: MAN Truck & Bus SE, Munich (DE)

(72) Inventors: Philipp Wagner, Munich (DE); Christian Haupt, Munich (DE); Julius Engasser, Munich (DE)

(73) Assignee: MAN Truck & Bus SE, Munich (DE)

( * ) Notice: Subject to any disclaimer, the term of this patent is extended or adjusted under 35 U.S.C. 154(b) by 144 days.

(21) Appl. No.: 18/266,494

(22) PCT Filed: Dec. 8, 2021

(86) PCT No.: PCT/EP2021/084796
§ 371 (c)(1),
(2) Date: Jun. 9, 2023

(87) PCT Pub. No.: WO2022/122820
PCT Pub. Date: Jun. 16, 2022

(65) Prior Publication Data
US 2024/0025265 A1   Jan. 25, 2024

(30) Foreign Application Priority Data
Dec. 11, 2020 (DE) ............. 10 2020 133 118.5

(51) Int. Cl.
*H01M 8/04858* (2016.01)
*B60L 7/18* (2006.01)
(Continued)

(52) U.S. Cl.
CPC ............ *B60L 7/22* (2013.01); *B60L 7/18* (2013.01); *B60L 53/66* (2019.02); *B60L 58/13* (2019.02);
(Continued)

(58) Field of Classification Search
CPC .. B60L 7/18; B60L 53/66; B60L 58/13; B60L 2200/36; B60L 2240/642;
(Continued)

(56) References Cited

U.S. PATENT DOCUMENTS

| | | |
|---|---|---|
| 2015/0251558 A1 | 9/2015 | Chen et al. |
| 2016/0325637 A1 | 11/2016 | Payne et al. |
| 2021/0284124 A1* | 9/2021 | Hoffmann ............. B60T 1/10 |

FOREIGN PATENT DOCUMENTS

| | | |
|---|---|---|
| DE | 102017219204 A1 | 5/2019 |
| DE | 102018131784 A1 | 6/2020 |

(Continued)

OTHER PUBLICATIONS

German Search Report issued in German Patent Application No. 102020133118.5 dated Oct. 6, 2021. English translation not available.

(Continued)

*Primary Examiner* — Muhammad S Islam
(74) *Attorney, Agent, or Firm* — Weber Rosselli & Cannon LLP

(57) ABSTRACT

The present invention relates to a method (100) for providing a storage capacity reserve in a traction battery (20) for an electrically driven motor vehicle (50), preferably commercial vehicle, for an upcoming downhill drive. The method (100) comprises detecting (S1) whether an electric charging operation of the traction battery (20) by means of an external charging source (60) is imminent, and determining (S2) one or more possible downhill routes (G1, G2) for an imminent downhill drive after the electric charging operation. The method (100) further comprises predicting (S3) one or more amounts of recuperated energy that will be recuperated by the motor vehicle (50) along each of the determined downhill routes (G1, G2), and determining (S4) a maximum battery state of charge of the traction battery (Continued)

(20) for the charging operation using the external charging source (60) as a function of the predicted amounts of recuperated energy. The present invention further relates to an apparatus (10) for providing a storage capacity reserve in a traction battery (20) for an electrically driven motor vehicle (50), preferably a commercial vehicle, for an upcoming downhill drive, and to an electrically driven motor vehicle (50), preferably a commercial vehicle, comprising the apparatus (10).

18 Claims, 3 Drawing Sheets

(51) Int. Cl.
*B60L 7/22* (2006.01)
*B60L 53/66* (2019.01)
*B60L 58/13* (2019.01)

(52) U.S. Cl.
CPC ..... *B60L 2200/36* (2013.01); *B60L 2240/642* (2013.01)

(58) Field of Classification Search
CPC .. B60L 2260/44; Y02T 10/7072; Y02T 10/70; Y02T 90/14
See application file for complete search history.

(56) References Cited

FOREIGN PATENT DOCUMENTS

| JP | 2019047687 A | 3/2019 |
| JP | 2020088940 A | 6/2020 |

OTHER PUBLICATIONS

International Search Report and Written Opinion issued in PCT Application No. PCT/EP2021/084796 dated Apr. 8, 2022. English translation no available.

* cited by examiner

METHOD AND DEVICE FOR PROVIDING A STORAGE CAPACITY RESERVE IN A TRACTION BATTERY FOR IMMINENT DOWNHILL DRIVE

CROSS-REFERENCE TO RELATED APPLICATIONS

This application is a 371 application of PCT/EP2021/084796 filed Dec. 8, 2021 which claims benefit of and priority to German Patent Application Serial No. DE102020133188.5 filed Dec. 11, 2020, the disclosures of the above-identified applications are hereby incorporated by reference in their entirety.

The invention relates to a method and an apparatus for providing a storage capacity reserve in a traction battery for an electrically driven motor vehicle, preferably a commercial vehicle, for an upcoming downhill drive, and to an electrically driven motor vehicle, preferably a commercial vehicle, comprising the apparatus.

Motor vehicles, especially commercial vehicles, cannot cope with longer downhill stretches using conventional friction brakes alone, as the heat generated by the friction brakes causes them to overheat after a short time and leads to high wear of the friction brakes.

In the case of vehicles powered by internal combustion engines, therefore, today's passenger cars and light commercial vehicles use the familiar engine braking function, while heavy commercial vehicles are additionally equipped with separate continuous braking systems for wear-free continuous braking, for example a primary and/or secondary retarder. A primary retarder is usually arranged on the engine side in the power flow ahead of the transmission, and a secondary retarder is arranged in the power flow behind the transmission.

Electrically driven motor vehicles can reverse the energy conversion in the event of braking, i.e. the electric motor acts as a generator and converts the kinetic energy of the motor vehicle into electrical energy through recuperative braking, whereby the drive axle is subject to a recuperative braking torque. During this process, known as recuperation, the electrical energy is stored back in the traction batteries, which requires that corresponding free storage capacity is available.

In the case that the traction batteries are fully charged, the resulting energy must be dissipated elsewhere, e.g. converted into heat in a braking resistor, and is lost for future traction purposes.

This problem occurs in particular during recuperative continuous braking, as may be necessary on long downhill stretches, since a lot of recuperated braking energy is generated here. Due to their weight, commercial vehicles in particular generate a lot of recuperated braking energy during recuperative continuous braking on longer downhill routes, which is lost as heat energy if it cannot be stored due to a lack of storage capacity in the traction battery.

From an energy, economic and ecological point of view, this situation is unsatisfactory.

The invention is thus based on the objective to provide an improved technique that enables wear-free recuperative continuous braking and avoids the disadvantages of conventional approaches. In particular, the task is to exploit the energy recovery potential through recuperative continuous braking with the highest possible efficiency and thus in an improved manner from an energy, economic and ecological point of view.

This objective is solved by the features of the independent claims. Advantageous further embodiments are indicated in the dependent claims and the description.

According to a first general aspect of the invention, there is provided a method for providing a storage capacity reserve in a traction battery for an electrically driven motor vehicle, preferably commercial vehicle, for an upcoming downhill drive. The method comprises detecting whether an electric charging operation of the traction battery by means of an external charging source is imminent, and determining one or more possible downhill routes for an imminent downhill drive after the electric charging operation. In other words, a prediction or estimation is made as to whether and which downhill route(s) is (are) considered for further travel after the external charging process. The method further comprises predicting or estimating one or more amounts of recuperated energy that will be recuperated by the motor vehicle along each of the determined downhill routes, and setting, e.g., lowering, a maximum battery state of charge of the traction battery for the charging process by means of the external charging source in dependence on the predicted amount or amounts of recuperated energy.

In other words, a basic idea of the invention is not to fully charge the traction battery during an external charging process, e.g. at a charging station, if it is foreseeable that after the charging process a downhill drive is pending during which more electrical energy may be recuperated than is consumed. In this case, in anticipation of the energy that may be recuperated during the downhill drive after the charging process, the maximum battery state of charge for the charging process, i.e. the state of charge up to which the traction battery is charged to during the next external charging process, is deliberately lowered in order to maintain a storage capacity reserve in the traction battery so that as much as possible of this future recuperated energy may be stored in the traction energy and as little as possible has to be released to the environment in the form of heat. How far the maximum battery state of charge is lowered for the charging process is determined as a function of a prediction or estimate of the amount of energy that may be recuperated during downhill driving.

Advantageously, an energy recovery potential may be exploited by recuperative continuous braking during an upcoming downhill drive with the highest possible efficiency. The amount of recuperated energy may be optimized to ensure recuperative continuous braking during the upcoming downhill drive without overcharging the traction battery, and preferably to avoid or at least reduce the use of braking resistors. The maximum permissible state of charge may be set in such a way that it leaves sufficient storage capacity reserve of the traction battery for the required continuous braking during the upcoming downhill drive and the energy recuperated in the process.

A downhill route is characterized by a section start of the downhill route having a higher terrain height than a section end of the downhill route. When driving along the downhill route, recuperated energy is absorbed by the motor vehicle continuously or at least in sections. When driving along the downhill route, the motor vehicle recuperates more electrical energy overall than it consumes, i.e. more electrical energy is stored in the traction battery than is extracted.

This does not preclude the downhill route from having sections along which the motor vehicle consumes more electrical energy than it recuperates. The downhill route may have level or uphill sections along which the motor vehicle consumes more electrical energy than it recuperates. The downhill route may have sections along which the motor vehicle consumes more electrical energy than it recuperates, as long as more electrical energy is recuperated than consumed over the entire downhill route.

The recuperated energy corresponds to potential energy of the motor vehicle, which is converted into electrical energy during deceleration of the motor vehicle (i.e. during a braking process of the motor vehicle) and stored in the traction battery, provided there is corresponding storage capacity. The recuperated energy is generated by an electric machine. The electric machine can act as an electric motor to drive the motor vehicle and, during the braking process, e.g. when the driver operates the brake pedal of the motor vehicle, as a generator and thus simultaneously as a brake.

The recuperated energy can correspond to an energy balance of the electrical energy absorbed and delivered by the traction battery. The energy balance has a positive energy balance along the entire downhill stretch (i.e., more electrical energy is absorbed than is delivered). Furthermore, the energy balance can take into account the electrical energy required to drive the motor vehicle from the charging position to the start of the downhill route.

A battery state of charge is a parameter that indicates a measure of the state of charge of the traction battery or from which the state of charge may be derived. For example, the battery state of charge can indicate the state of charge relative to the charge capacity of the traction battery, where a fully charged traction battery has a battery state of charge of 100%. The battery state of charge (is also referred to as the "State of Charge" or SoC).

The maximum battery state of charge of the traction battery for the next charging process using the external charging source specifies a limit up to which the traction battery may be permissibly charged during the charging process using the external charging source. When the maximum battery state of charge is reached, the external charging process is automatically terminated by the motor vehicle. The adjustment of the maximum battery state of charge according to the invention preferably applies only to the next charging process by means of the external charging source. During operation, this maximum battery state of charge can and should be exceeded by storing recuperatively generated energy.

Usually, the maximum battery state of charge is set to a value below 100% of the maximum storage capacity, e.g. 85%, to improve the service life of the traction battery. The charging process is terminated when the maximum battery state of charge is reached. In the context of the invention, this maximum state of charge is selectively (deliberately) lowered for external charging of the traction battery if, for example, further downhill travel is predicted and associated energy recovery by recuperative braking. The maximum battery state of charge may be used to reliably terminate charging processes at a higher location automatically at a battery state of charge equal to the maximum battery state of charge, thus providing sufficient storage capacity to absorb recuperated energy when driving further downhill.

According to a particularly preferred embodiment, the highest amount of recuperated energy may be selected from the predicted amounts of recuperated energy recuperated by the motor vehicle along each of the determined downhill routes and the maximum battery state of charge may be determined as a function of the highest amount. The maximum battery state of charge can result from a storage capacity or from a set value for the maximum battery state of charge of the traction battery minus the selected highest amount.

Advantageously, recuperative continuous braking may be ensured during the upcoming downhill drive along each of the specified downhill routes without overcharging the traction battery and avoiding the use of braking resistors. Thus, the specified maximum battery state of charge may be the lowest among the possible maximum battery state of charges of the possible downhill routes. Thus, the maximum battery charge state that provides the largest storage capacity reserve of the traction battery is selected to avoid overcharging of the traction battery, regardless of which of the possible gradient routes the driver ultimately chooses to continue driving.

According to a particularly preferred embodiment, setting a maximum battery state of charge may comprise manually selecting one of the determined gradient routes and/or one of the predicted amounts of recuperated energy by a user via a charging dialog, and setting the maximum battery state of charge as a function of the selected gradient routes and/or the selected amount of recuperated energy.

Alternatively or additionally, the defined maximum battery state of charge for the next external charging process may be changed and/or modified manually by the user via a charging dialog.

It can also be provided that the user must confirm the proposed lowering of the maximum battery state of charge as part of a charging dialog, e.g. by the user confirming a lowering of the maximum battery state of charge for the next external charging process by means of a rotary pushbutton as a control element. Alternatively or additionally, a confirmation of the proposed lowering of the maximum battery state of charge may be made by voice input and/or on a touch-sensitive screen by touch input. In this way, the user may be prevented from being "surprised" by a surprisingly low-charged traction energy storage system when continuing to drive.

The term "charging dialog" is understood to mean a user interaction, e.g. via the vehicle infotainment system, which is optionally performed in accordance with the embodiments described above when the procedure for providing a storage capacity reserve in the traction battery is carried out by the vehicle side.

It is also conceivable that the user interaction is performed by means of a portable device, e.g., a mobile terminal. The proposed lowering of the maximum battery state of charge may be displayed, for example, by means of an application on a screen of the portable device. The user confirmation may be captured by means of the application and an input unit of the portable device, e.g., a touch screen.

Further alternatively or additionally, the distance to the upcoming downhill drive may be specified manually by the user, for example by means of a navigation system, and the maximum battery state of charge may be determined as a function of the manually specified distance.

Manual selection may be used to change the maximum battery state of charge set as a function of the highest amount, thus improving the accuracy of the maximum battery state of charge adjustment.

Advantageously, the user, e.g. the driver, may himself define the route to be taken after the charging process and thus, if necessary, the downhill route for the downhill drive after the electric charging operation, or manually change the maximum battery state of charge, whereby recuperative continuous braking may be ensured along the entire defined downhill route and the traction battery is charged to its storage capacity or the setpoint at the end of the downhill drive. The user is thus given the option of manually changing the system's automatically generated suggestion of the maximum battery state of charge or the route to be considered for the onward journey, either by entering the "correct" downhill route or route for the onward journey from the user's point of view, or by directly specifying the value preferred or corrected from the user's point of view for the maximum battery state of charge at which the upcoming external charging process is aborted.

According to a further embodiment, the amounts of recuperated energy may be predicted with the aid of a stored motor vehicle model. Motor vehicle models for electrically driven vehicles that estimate an energy balance (amount of recuperated energy vs. amount of consumed energy), also taking into account topographical elevation data along an upcoming route, are known from the prior art, e.g. to predict the range of the purely electrically driven vehicle.

According to a preferred embodiment, the amounts of recuperated energy may be predicted with the aid of a stored motor vehicle model that takes into account at least one, preferably several, of the following parameters for the upcoming downhill journey: a gradient, a speed of the motor vehicle, a load of the motor vehicle, weather and temperature data, and energy consumption by vehicle consumers, such as a cooling system, an air conditioning, a heating, or vehicle components, such as a refrigerated container The energy consumption of vehicle consumers (vehicle loads) may include current energy consumption and/or expected energy consumption during downhill travel. The current energy consumption may be determined by the current electrical energy drawn from the traction battery. Expected energy consumption may be determined by considering weather and temperature data and/or time of year.

The stored motor vehicle model may be determined or refined from driving cycles and/or real vehicle measurements, on the basis of which the amount of recuperated energy is determined experimentally for different values of the parameters taken into account in the motor vehicle model for different downhill gradients and which, for example, take into account a duration and intensity of the continuous braking depending on the gradient.

The prediction of the amounts of recuperated energy with the help of the stored motor vehicle model can include a determination (detection) of the parameters. The load of the motor vehicle and/or the weather and temperature data may be specified manually via a loading dialog. The weather and temperature data may be determined using a sensor system. The weather and temperature data may be acquired via a radio link from an external weather station and/or an external weather information system. The slope of the downhill slope may be determined using topography data. The speed of the motor vehicle may be determined based on speed limits that apply along the downhill slope and/or current traffic data for the downhill slope. The current traffic data may be acquired from an external traffic information system via a radio link.

Advantageously, the extent to which the amount of recuperated energy is influenced by various factors may be taken into account. For example, the load and thus the weight of the motor vehicle can influence the amount of recuperated energy, especially in the case of commercial vehicles. Thus, with higher weight, a higher intensity of continuous braking is also necessary, i.e., with higher weight, the amount of recuperated energy also increases. Further advantageously, it may be taken into account how much electrical energy, in particular for operating auxiliary consumers, is drawn from the traction battery during downhill driving. The weather and temperature data can, for example, provide an indication of the cooling or heating power to be expected.

The stored motor vehicle model can comprise one or more multi-dimensional characteristic diagrams. The maps can take into account the parameters and the relationship between the parameters. The stored motor vehicle model may further comprise one or more functions depending on the parameters. The stored motor vehicle model may be evaluated by appropriate algorithms to determine the amount of recuperated energy.

According to a further embodiment, the maximum battery state of charge may further be determined as a function of a storage capacity of the traction battery, a current state of charge of the traction battery, and/or a current vehicle mass, including a payload. Determining the maximum battery state of charge may include detecting the storage capacity of the traction battery, the current state of charge of the traction battery, and/or the current vehicle mass, including payload.

According to a further embodiment, each downslope section of the one or more downslope sections may be determined based on topographic data, with at least one of the following conditions being present:
a) the downhill route is passable for the motor vehicle;
b) the length of the downhill route is above a predetermined minimum length;
c) a beginning (section) of the downhill route lies within a distance to a charging position at which the electric charging operation is carried out and has a gradient above a predetermined limit value, which is preferably determined from driving cycles and/or real vehicle measurements;
d) an end (section) of the downhill route has a lower ground level than the charging position and a gradient below the predetermined limit value, preferably wherein a travel section of a predetermined length following the end of the section has an average gradient below the predetermined limit value.

Furthermore, a difference in terrain height between the charging position and the start of the section may be smaller than a predetermined maximum difference and/or the downhill route may have an average gradient above the predetermined limit value. The gradient may also be referred to as gradient inclination.

Based on the above criteria, the selection of the downhill routes to be considered is improved.

For example, the predetermined limit value may be used to determine that the downhill route is "over", if the value of the gradient is small again and the section is, at least to a large extent, level again.

Advantageously, topographic data in the vicinity of the current vehicle position, including the terrain elevation of the vehicle position, may be used to determine possible downhill distances that may be covered by the motor vehicle downhill until the motor vehicle reaches a lower level in which more electrical energy is consumed again during driving than is recuperated and the current gradient inclination may be considered to have been overcome.

The topographic data may include road network maps and/or road network topographic information. The road network maps may include three-dimensional road network maps. The topographic information may describe road networks based on geographic longitudes, latitudes, and elevations. The topographic information may further include route characteristics for each route of the road networks. The route characteristics for each route may include a route type (e.g., urban road, rural road, highway, unpaved roadway), route infrastructure (e.g., road signs, traffic signals), speed limits, and information on whether the route is impassable to vehicle categories (e.g., heavy trucks, truck trains, buses).

According to another embodiment, detecting whether an electric charging operation of the traction battery by means of an external charging source is imminent may comprise detecting a current location of the motor vehicle and checking whether the detected location corresponds to a location category suitable for an electric charging operation, for example a charging station.

Detecting whether electrical charging of the traction battery by an external charging source is imminent may further include detecting that the motor vehicle is electrically connected to the external charging source.

Detection of whether an electrical charging process of the traction battery by means of an external charging source is imminent may be checked on the basis of a user query, e.g. as part of the charging dialog, and/or can furthermore only take place when the motor vehicle is at a standstill.

Advantageously, the process may be automated, preferably completely, and the maximum battery state of charge may be determined before the electrical charging process is carried out.

According to a further embodiment, the method may further comprise electrically charging the traction battery only until the predetermined maximum battery state of charge of the traction battery is reached.

Electrical charging may not occur until the maximum battery state of charge is established. The method may further comprise controlling the external charging source, e.g., a charging station, in such a manner that the electrical charging only start after the maximum battery state of charge is determined and/or that the electrical charging is stopped when the maximum battery state of charge is reached.

According to a further embodiment, a lower limit value, for example 15%, and an upper limit value, for example 85%, may be defined for the state of charge (charge level) of the traction battery in order to optimize the service life of the traction battery. Falling below the lower limit value and/or exceeding the upper limit value can only be permissible in predetermined exceptional situations.

Advantageously, the lower and upper limit values can protect the traction battery, e.g. reduce aging of the traction battery by excluding complete charging or complete discharging of the traction battery.

An exceptional situation in which exceeding the upper limit value is permissible may exist if it is determined on the basis of topographical data that a section of the route on which more electrical energy is consumed than is recuperated is reached within a predetermined time and/or distance, with the upper limit value being undershot again.

Advantageously, recuperative continuous braking is ensured for the entire downhill drive and a forced pause due to a short remaining distance is avoided, with the state of charge of the traction battery remaining above the upper limit for only a short period.

To maintain the upper limit in the presence of excess recuperated energy, the excess energy may be dissipated to the environment as thermal energy via a braking resistor. This use of the braking resistor may be indicated to a user in the form of a warning and/or request to stop on a display. Displaying this use of the braking resistor may only occur when the braking resistor reaches a thermally critical state.

A particular advantage of the method according to the invention for providing a storage capacity reserve is that the braking resistor may be dimensioned smaller than a conventional braking resistor designed for continuous operation, for which the method according to the invention is not used. The reason is that due to the method according to the invention, the braking resistor is needed less.

Advantageously, the braking resistor which may be designed much smaller, may be used for emergencies, which is not required in normal operation. By providing the braking resistor, the "downhill reserves" of the motor vehicle for the energy generated during braking and thus the continuous braking function of the electric machine may be significantly increased. Compared with a braking resistor dimensioned and cooled for continuous operation without the method according to the invention for providing a storage capacity reserve, additional value can thus be achieved in terms of the safety and usability of the vehicle with only slightly reduced efficiency.

To maintain the upper limit value for the state of charge of the traction battery in the presence of excess recuperated energy, a time-limited additional start-up of auxiliary consumers, for example a heating and/or air conditioning system, may also be carried out.

To maintain the upper limit in the presence of excess recuperated energy, an inverter of the motor vehicle may also be controlled in such a way that a higher power loss is specifically generated in the inverter and/or in an electric machine of the motor vehicle. Any additional heat generated by the inverter and/or the electric machine may be dissipated to the environment via a cooling system.

Advantageously, as countermeasures to the excess recuperated energy, the consumption of electrical energy (i.e. the extraction of electrical energy from the traction battery) can thus be increased and/or less recuperated energy may be generated by manipulating the inverter or the electrical machine. These countermeasures allow the upper limit to be maintained and ensure recuperative continuous braking for the entire downhill run.

According to a second general aspect of the invention, there is provided an apparatus for providing a storage capacity reserve in a traction battery for an electrically driven motor vehicle, preferably a commercial vehicle, for an upcoming downhill drive. The vehicle is preferably a purely electrically driven motor vehicle. The apparatus comprises a control device configured to perform the method as disclosed herein.

In order to avoid repetition, features previously disclosed purely according to the method are also to be considered disclosed as claimable features of the apparatus or as functional features thereof.

According to a particularly preferred embodiment, the apparatus may further comprise a motor-operable electric machine and/or a traction battery for providing electric energy for the electric machine and for receiving energy recuperated by the electric machine. The electric machine may further be operable in a regenerative manner, preferably during a braking process of the motor vehicle, for generating recuperated energy.

The apparatus may further comprise a navigation system for providing topographic data and preferably for determining one or more of one or more possible downhill routes for an upcoming downhill trip following a loading operation of the motor vehicle.

The apparatus may further comprise a display and input apparatus for providing a loading dialog to a user of the motor vehicle.

The apparatus may further comprise a braking resistor operable in an exceptional situation, preferably when an upper limit of the battery state of charge is reached or a thermally critical condition.

According to a third general aspect of the invention, there is provided an electrically driven motor vehicle, preferably a commercial vehicle, comprising an apparatus as disclosed herein.

The motor vehicle is preferably exclusively electrically driven or drivable (i.e., the motor vehicle does not have an internal combustion engine).

The previously described embodiments, variants and features of the invention may be combined with each other as desired. Further details and advantages of the invention are described below with reference to the accompanying drawings.

Figure 1:
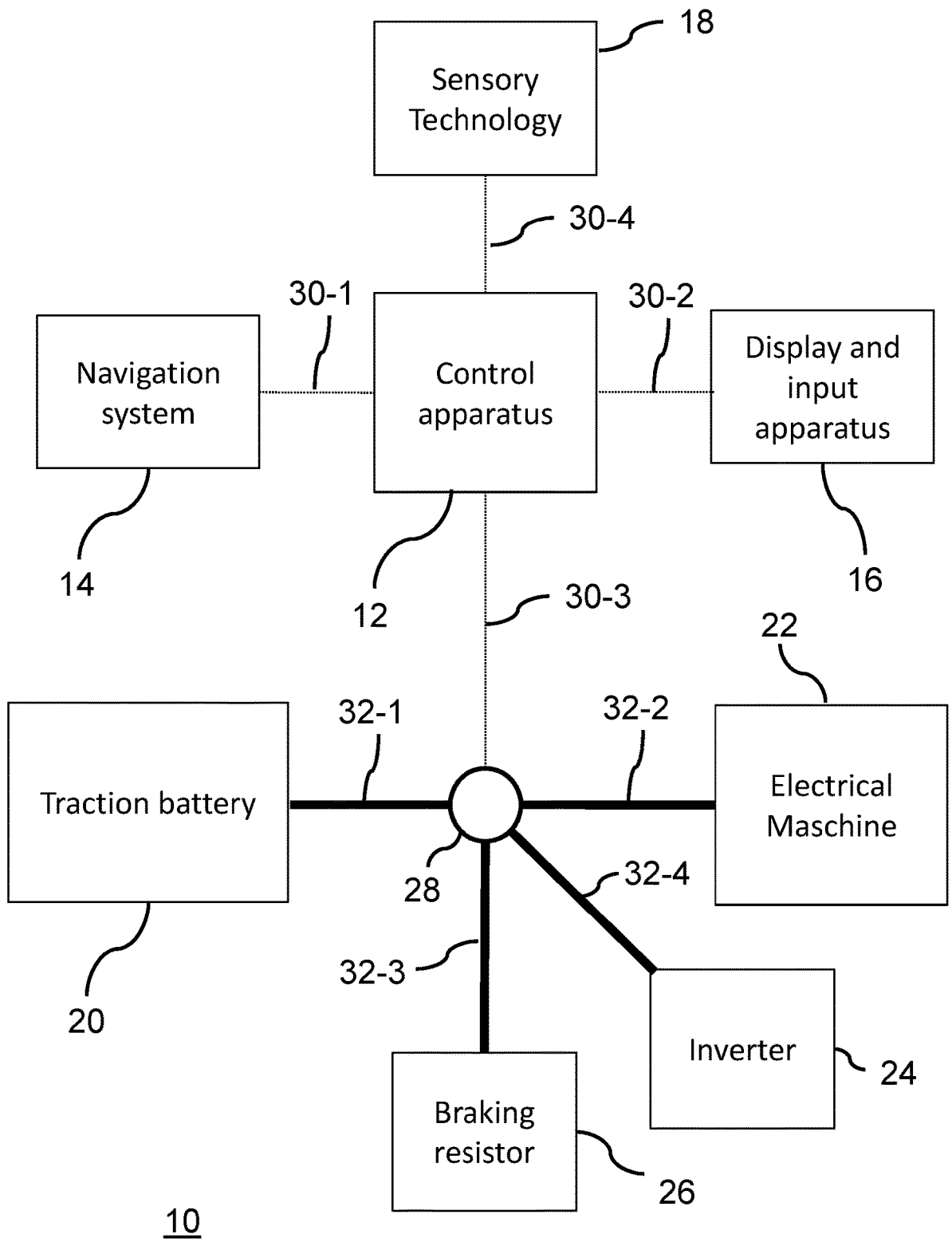
FIG. 1 shows a schematic view of an apparatus according to one embodiment.

FIG. 1 schematically shows the apparatus 10 for providing a storage capacity reserve in a traction battery 20 for an electrically driven motor vehicle for an upcoming downhill drive.

Figure 2:
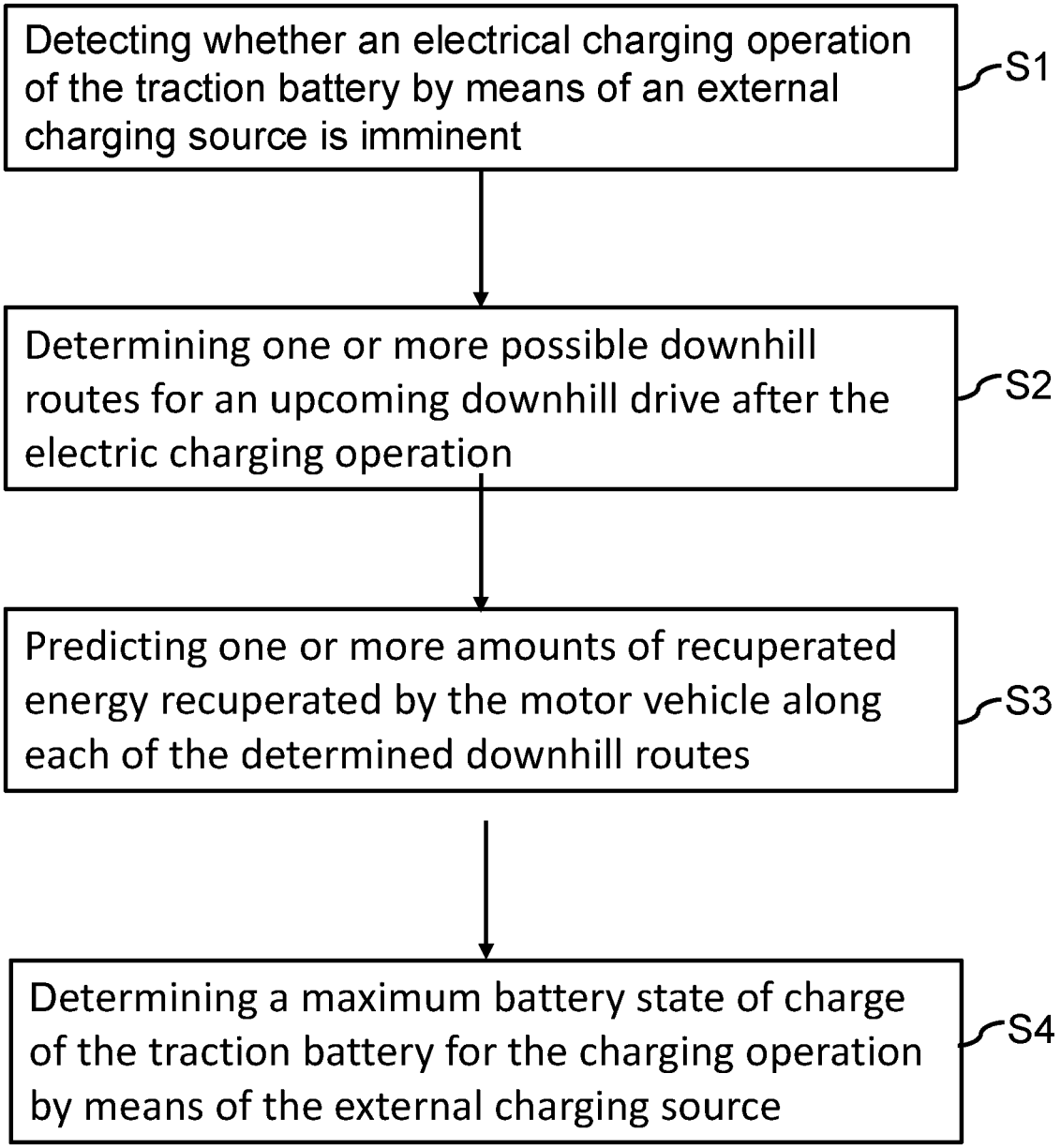
FIG. 2 shows a schematic representation of a method according to one embodiment.
Figure 3:
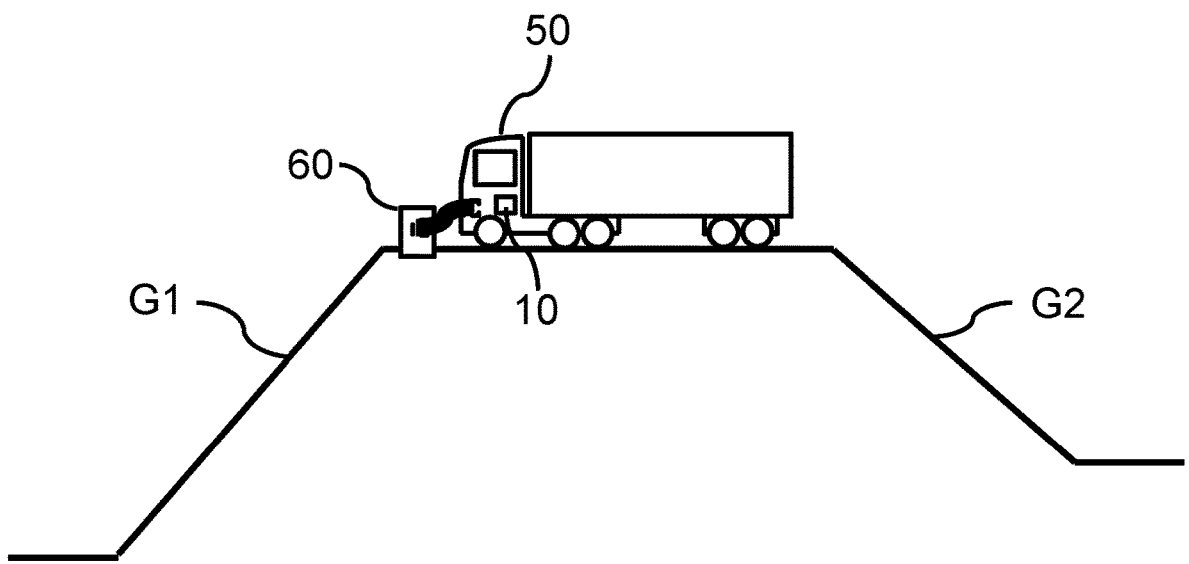
FIG. 3 shows a schematic representation of a motor vehicle according to one embodiment before a charging process.

The apparatus 10 includes a control apparatus 12 configured to perform the method 100, which is described in further detail with the reference to FIGS. 2 and 3.

The apparatus 10 may further include a navigation system 14, a display and input apparatus 16, and/or a sensor system 18.

The navigation system 14 is used to provide topography data, and the display and input apparatus 16 is used to provide a loading dialog for a user of the motor vehicle 50. The sensor apparatus 18 may be used to determine weather and temperature data, for example. The navigation system 14, the display and input apparatus 16, and the sensor system 18 may be communicatively connected to the control apparatus 12 via communication lines 30-1, 30-2, and 30-4.

The apparatus 10 may further include a motor-drivable electric machine 22, an inverter 24, a traction battery 20, and/or a braking resistor 26. The electric machine 22, the inverter 24, and the traction battery 20, which is configured to provide electrical power to the electric machine 22 and to receive energy recuperated from the electric machine 22, may be components of a drive train for an electrically powered motor vehicle. The braking resistor 26 may be configured to be operable in an exceptional situation, preferably when an upper limit of the battery state of charge is reached or a thermally critical condition.

The control apparatus 12 may be designed to control the electric machine 22, the inverter 24, the traction battery 20 and/or the braking resistor 26. This may be done, for example, via power electronics 28, the control apparatus 12 being connected to the power electronics 28 in terms of communication via a communication line 30-3, and the power electronics 28 in turn being electrically connected to the electric machine 22, the inverter 24, the traction battery 20 and the braking resistor 26 via electrical lines 32-1, 32-2, 32-3 and 32-4.

FIG. 2 schematically illustrates the method 100 for providing a storage capacity reserve in a traction battery 20 for an electrically driven motor vehicle 50, preferably a commercial vehicle, for an upcoming downhill drive. Furthermore, FIG. 3 schematically shows a motor vehicle 50 before an electrical charging process.

The motor vehicle 50, for example a loaded truck, travels to a mountain village and arrives at the destination with a low state of charge of the traction battery 20. If the traction battery 20 were now fully charged at an external charging source 60, the continuous braking provided by a recuperative braking operation of the electric machine 22 could not be used on the return trip to the valley.

In step S1 of the method 100, it is first detected whether the electric charging operation of the traction battery 20 by means of an external charging source 60 is imminent.

The imminence of the electric charging operation may be detected in various ways. First, a current location of the motor vehicle 50 may be detected, for example by means of the navigation system 14, and a check may be made to determine whether the detected location corresponds to a suitable location category for an electric charging operation. A suitable location category may be, for example, a charging station or a loading and unloading terminal. Further, it may be detected that the motor vehicle 50 is electrically connected to the external charging source 60, for example, that a charging cable is connected to the motor vehicle 50 via a corresponding charging interface.

Alternatively or additionally, the detection of whether the electric charging operation of the traction battery 20 by means of an external charging source 60 is imminent may be checked by means of a user query. For example, the driver may be asked by means of the display and input apparatus 16 whether an electrical charging process is imminent, which in turn may be confirmed or rejected by the driver by means of an input.

Furthermore, it may be provided that the detection of whether the electric charging operation of the traction battery 20 by means of an external charging source 60 is imminent only takes place when the motor vehicle 50 is at a standstill.

In step S2 of the method 100, one or more possible downward routes are determined for an upcoming downward route (travel route) after the electric charging operation.

The downhill routes G1, G2, i.e. all possible routes back to the valley or to lower levels, may be determined using topography data from the navigation system 14.

For example, the downhill routes G1 and G2 depicted in FIG. 3 can be determined, leading from the mountain village to different lower-lying plains or valleys.

One or more conditions may be specified that must be met in order to determine the downhill routes G1, G2. One condition may be that the downhill route G1, G2 is passable for the motor vehicle 50. Furthermore, it may be required that the length of the downhill route G1, G2 is above a predetermined minimum length.

Furthermore, conditions may be defined for a route start and a route end of the downhill route G1 and G2, respectively. The start of the route may be within a distance of a charging position at which the electric charging operation is performed, e.g. at a position near the external charging source 60, and may have a gradient above a predetermined limit value. The end of the route may have a lower terrain elevation than the charging position and a slope inclination below the predetermined limit.

For example, it may be required that all conditions must be fulfilled, whereby of all downhill routes only the downhill routes G1 and G2 fulfill these conditions and are thus taken into account for the further procedure.

In step S3 of the method 100, one or more amounts of recuperated energy recuperated by the motor vehicle 50 along each of the determined downhill routes G1, G2 are predicted.

The amounts of recuperated energy may be predicted using a stored motor vehicle model that takes into account at least one of the following parameters for the upcoming downhill drive: a gradient, a speed of the motor vehicle 50, a load of the motor vehicle 50, weather and temperature data, and an energy consumption of motor vehicle consumers. It has already been explained above that the downhill route results, in total or in effectively, in a surplus of recuperated energy, whereby an electrical energy consumption on partial sections of the "downhill slope", e.g. going uphill, is taken into account accordingly in the predicted amount of recuperated energy.

One or more parameters considered by the motor vehicle model may be manually specified via the loading dialog provided by the display and input apparatus 16 and/or determined by means of the sensor system 18, such as the load of the motor vehicle 50 and/or weather and temperature data.

In step S4 of the method 100, a maximum battery state of charge of the traction battery 20 for the charging process using the external charging source 60 is determined depending on the predicted amounts of recuperated energy.

Preferably, the maximum battery state of charge is determined automatically such that the highest amount is selected from the predicted amounts of recuperated energy and the maximum battery state of charge is determined as a function of the highest amount. For example, based on the amounts of recuperated energy predicted in step S3, it may be determined that a higher amount of recuperated energy may be recuperated by the motor vehicle 50 along the downhill path G1 than along the downhill route G2, and therefore the maximum battery state of charge may be determined as a function of the predicted amount along the downhill route G1.

The maximum battery state of charge may be derived from a storage capacity or a set point for the maximum battery state of charge of the traction battery 20 minus the selected highest amount.

The setpoint is an upper limit value, for example 85%, for the state of charge of the traction battery 20, which is specified for service life optimization of the traction battery 20 and is usually not exceeded. In addition to the upper limit value, a lower limit value, for example 15%, is also generally specified, which should generally not be undershot.

The automatically determined maximum battery state of charge can further be manually corrected in various ways.

By way of example, the user may select one of the specific downhill routes and/or one of the predicted amounts of recuperated energy via the charging dialog, so that the maximum battery state of charge is determined as a function of the selected downhill route and/or the selected amount of recuperated energy. For example, the possible downhill routes G1 and G2 may be displayed to the driver by means of the display and input apparatus 16, from which the driver can select the desired downhill route for the downhill journey by input.

The specified maximum battery state of charge may also be manually changeable and/or altered by the user via the charging dialog. For example, the user, e.g., the driver of the motor vehicle 50, can discard the specified maximum battery state of charge and enter a higher value if he wants to drive further uphill, e.g., to reach an even higher destination.

Furthermore, a route for the upcoming downhill drive may be specified manually by the user by means of the navigation system 14 and the maximum battery state of charge may be determined as a function of the manually specified route. The user can thus specify a route in advance for the return trip to the valley and thus allow a higher state of charge, so that the automatically determined maximum battery state of charge is not relevant.

After the maximum battery state of charge of the traction battery 20 has been established, the traction battery 20 may be electrically charged to the established maximum battery state of charge.

During the subsequent downhill drive, a situation may arise in which the storage capacity of the traction battery 20 or the predetermined setpoint value is reached before the end of the selected downhill route is reached. This may be the case, for example, if incorrect parameters, which are taken into account by the motor vehicle model, have been specified by the user via the charging dialog provided by the display and input apparatus 16.

In predetermined exceptional situations, exceeding the upper limit is permissible. Such an exceptional situation may exist if it is determined on the basis of topography data that a section of the route on which more electrical energy is consumed than is recuperated is reached within a predetermined time and/or distance, with the upper limit value being undershot again.

Further, countermeasures may be taken to prevent the amount of stored recuperated energy from increasing above the set point. For example, the excess energy may be dissipated to the environment as thermal energy via a braking resistor 26, whereby this use of the braking resistor 26 may be indicated to a user on a display in the form of a warning and/or request to stop. In addition, a timed additional start-up of auxiliary loads, such as a heating and/or air conditioning system, may be performed to consume electrical energy. Further, the inverter 24 may be controlled such that a higher power dissipation is selectively generated in the inverter 24 and/or in the electric machine 22. This additionally generated heat of the inverter 24 and/or the electric machine 22 may be dissipated to the environment via a cooling system.

The invention is not limited to the preferred embodiments described above. Rather, a large number of variants and variations are possible which also make use of the inventive concept and therefore fall within the scope of protection. In particular, the invention also claims protection for the subject matter and the features of the dependent claims independently of the referenced claims. In particular, the individual features of independent claim 1 are each independently disclosed. In addition, the features of the dependent claims are also disclosed independently of all the features of independent claim 1.

LIST OF REFERENCE SIGNS

10 Apparatus
12 Control apparatus
14 Navigation system
16 Display and input apparatus
18 Sensor technology
20 Traction battery
22 Electric machine
24 Inverter
26 Braking resistor
28 Power electronics
30-1, . . . , 30-4 Communication line
32-1, . . . , 32-4 Electrical line
50 Motor vehicle
60 External charging source
100 Method
S1, S2, S3, S4 Method steps
G1, G2 Downhill route

The invention claimed is:

1. A method for providing a storage capacity reserve in a traction battery for an electrically driven motor vehicle for an upcoming downhill drive, comprising the steps:
   a) detecting whether an electrical charging operation of the traction battery by means of an external charging source is imminent;
   b) determining one or more possible downhill routes for an upcoming downhill drive after the electric charging operation;
   c) predicting one or more amounts of recuperated energy recuperated by the motor vehicle along each of the determined downhill routes; and
   d) determining a maximum battery state of charge of the traction battery for the charging operation by means of the external charging source depending on the predicted amounts of recuperated energy,
   wherein a lower limit value, for example 15%, and an upper limit value, for example 85%, are defined for the battery state of charge of the traction battery in order to optimize the service life of the traction battery, wherein falling below the lower limit value and/or exceeding the upper limit value is only permissible in predetermined exceptional situations, and
   wherein an exceptional situation in which exceeding the upper limit value is permissible is present if it is determined, on the basis of topography data, that a route section on which more electrical energy is consumed than is recuperated is reached within a predetermined time and/or distance, wherein the upper limit value is again undershot.

2. The method according to claim 1, wherein:
   the motor vehicle is a commercial vehicle; and/or
   among the predicted amounts of recuperated energy the highest amount is selected and the maximum battery state of charge is determined as a function of the highest amount.

3. The method according to claim 1, wherein
   a) the determining of a maximum battery state of charge comprises a manual selection by a user via a charging dialog of one of the determined downhill routes and/or one of the predicted amounts of recuperated energy, and the maximum battery state of charge is determined depending on the selected downhill route and/or the selected amount of recuperated energy, and/or
   b) the specified maximum battery state of charge may be changed and/or is changed manually by the user via a charging dialog, and/or
   c) a distance for the upcoming downhill drive is specified manually by the user, and the maximum battery state of charge is determined as a function of the manually specified distance.

4. The method according to claim 1, wherein the amounts of recuperated energy are predicted using a stored motor vehicle model that takes into account at least one of the following parameters for the upcoming downhill drive: a gradient, a speed of the motor vehicle, a load of the motor vehicle, weather and temperature data, and an energy consumption by vehicle consumers, such as a cooling system, an air conditioning, a heating, or vehicle components, such as a refrigerated container.

5. The method according to claim 1, wherein the maximum battery state of charge is further determined as a function of a storage capacity of the traction battery, a current state of charge of the traction battery, and/or a current vehicle mass, including a payload.

6. The method according to claim 1, wherein each downhill route of the one or more downhill routes is determined based on topography data and the presence of at least one of the following conditions:
   a) the downhill route is passable for the motor vehicle;
   b) the length of the downhill route is above a predetermined minimum length;
   c) a beginning of the downhill route is within a distance from a charging position at which the electric charging operation is performed and has a gradient above a predetermined limit value; and/or
   d) a section end of the downhill route has a lower terrain height than the charging position and a gradient below the predetermined limit value.

7. The method according to claim 1, wherein:
   a) a distance for the upcoming downhill drive is specified manually by the user by means of a navigation system, and the maximum battery state of charge is determined as a function of the manually specified distance; and/or
   b) a stored motor vehicle model is determined from driving cycles and/or real vehicle measurements, on the basis of which the amount of recuperated energy is determined experimentally for different values of the parameters taken into account in the motor vehicle model for different downhill routes and which take into account a duration and intensity of a recuperative continuous braking process depending on the gradient, and/or
   c) a beginning of the downhill route is within a distance from a charging position at which the electric charging operation is performed and has a gradient above a predetermined limit value, which is determined from driving cycles and/or real vehicle measurements; and/or
   d) a section end of the downhill route has a lower terrain height than the charging position and a gradient below the predetermined limit value, wherein a travel section of a predetermined length adjoining the section end having an average gradient below the predetermined limit value.

8. The method according to claim 1, wherein detecting whether an electrical charging operation of the traction battery by means of an external charging source is imminent,
   a) comprises detecting a current location of the motor vehicle and checking whether the detected location corresponds to a location category suitable for an electric charging operation, for example a charging station, and/or
   b) comprises detecting that the motor vehicle is electrically connected to the external charging source; and/or
   c) only occurs when the motor vehicle is at a standstill, and/or
   d) is checked by means of a user query.

9. The method according to claim 1, further comprising electrically charging the traction battery until the predetermined maximum battery state of charge of the traction battery is reached.

10. The method of claim 1, wherein, in order to maintain the upper limit in the presence of excess recuperated energy
   a) the excess energy may be dissipated to the environment as thermal energy via a braking resistor, this use of the braking resistor being indicated to a user in the form of a warning and/or request to stop on a display; and/or
   b) a time-limited additional start-up of auxiliary consumers is carried out, and/or c) an inverter of the motor vehicle is controlled in such a way that a higher power loss is specifically generated in the inverter and/or in an electric machine of the motor vehicle.

11. The method of claim 1, wherein:
a) the braking resistor being indicated to a user in the form of a warning and/or request to stop on a display only takes place when a thermally critical state of the braking resistor is reached; and/or
b) the auxiliary consumers include a heating system and/or an air conditioning system; and/or
c) the inverter of the motor vehicle is controlled with any additionally generated heat of the inverter and/or of the electric machine being dissipated to the environment via a cooling system.

12. An apparatus for providing a storage capacity reserve in a traction battery for an electrically driven motor vehicle for an upcoming downhill drive, comprising:
a control apparatus configured to perform the method according to claim 1.

13. The method according to claim 2, wherein the maximum battery state of charge results from a storage capacity or from a set point for the maximum battery state of charge of the traction battery minus the selected highest amount.

14. The method according to claim 4, wherein
a) the stored motor vehicle model is determined from driving cycles and/or real vehicle measurements, on the basis of which the amount of recuperated energy is determined experimentally for different values of the parameters taken into account in the motor vehicle model for different downhill routes and which, for example, take into account a duration and intensity of a recuperative continuous braking process depending on the gradient, and/or
b) the load of the motor vehicle and/or the weather and temperature data are specified manually via a loading dialog and/or the weather and temperature data are determined by means of a sensor system.

15. The apparatus of claim 12, further comprising:
a motor-driven electric machine; and/or
a traction battery for providing electrical power to the electric machine and for receiving energy recuperated by the electric machine; and/or
a navigation system for providing topographic data; and/or
a display and input apparatus for providing a loading dialog to a user of the motor vehicle; and/or
a braking resistor that may be used in an exceptional situation.

16. An electrically driven motor vehicle comprising an apparatus according to claim 12.

17. The apparatus of claim 15, wherein:
providing topographic data includes determining one or more possible downhill routes for an upcoming downhill journey after a loading process of the motor vehicle; and/or
the exceptional situation includes when an upper limit of the battery state of charge is reached or a thermally critical condition; and/or
the motor vehicle is a commercial vehicle.

18. The electrically driven motor vehicle of claim 16 is a commercial vehicle.

* * * * *